March 12, 1929.    E. E. PLANT    1,704,761

TANK LEVEL SIGNAL

Filed Feb. 8, 1928

INVENTOR.
EDWARD E. PLANT.
By Arthur L. Slee,
ATTY.

Patented Mar. 12, 1929.

1,704,761

UNITED STATES PATENT OFFICE.

EDWARD E. PLANT, OF SAN FRANCISCO, CALIFORNIA, ASSIGNOR OF ONE-HALF TO CHRIS PETERSEN, OF SAN FRANCISCO, CALIFORNIA.

TANK-LEVEL SIGNAL.

Application filed February 8, 1928. Serial No. 252,807.

My invention relates to improvements in level signals for tanks wherein a signal is arranged to be energized through an electric switch mounted within a chamber sealed from the tank and arranged to be actuated by a float within the tank to operate the signal when the level of liquid stored in the tank reaches a predetermined point.

The primary object of my invention is to provide an improved device for signaling when the level of liquid within a tank reaches a predetermined level.

Another object is to provide an improved device wherein an electric switch is arranged to be actuated by positive connection with a float mounted within a tank.

A further object is to provide an improved device of the character described wherein the electric switch is effectually sealed away from the tank to avoid any possible danger of igniting the contents of the tank when the switch is operated.

Another object is to provide an improved device which will be positive in its action and which may be readily adjusted to operate at a desired level.

A further object is to provide an improved device wherein a switch is mounted in accessible position in relation to an inaccessible embedded tank, and which will facilitate installation, inspection, adjustment and repair when necessary.

A still further object is to provide an improved construction whereby a float of relatively large volume may be inserted and removed through a conduit of relatively small diameter.

I accomplish these and other objects by means of the improved device disclosed in the drawings forming a part of the present application wherein like characters of reference are used to designate similar parts throughout the specification and drawings and in which—

Figure 1:
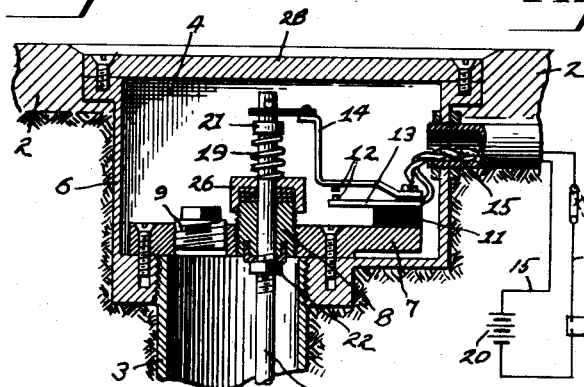
Fig. 1 is a broken vertical section showing the manner in which my improved signaling means is mounted in connection with an embedded tank.
Figure 2:
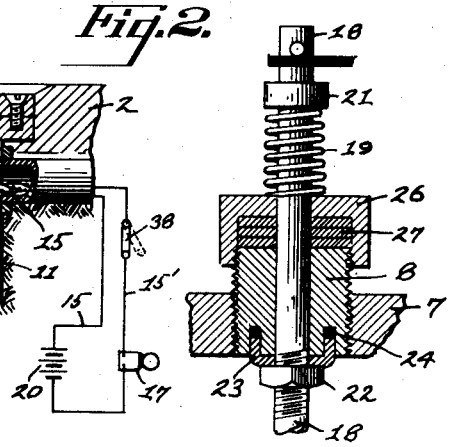
Fig. 2 is a sectional detail of the rod packing means for sealing the switch chamber.

Referring to the drawings, the numeral 1 is used to designate in general a storage tank such as a fuel oil tank of the type buried at a considerable depth in the ground, usually under the sidewalk, 2, for storing fuel oil for buildings and homes. Such tanks are of course inaccessible, the fuel being introduced and withdrawn through pipe connections in a well known manner not shown in the drawings. Deliveries of fresh supplies of fuel must of course be made at intervals. Much inconvenience and annoyance, and frequently hardship, results from the failure of an attendant to note that the supply of fuel oil has become low and thereby permitting the supply to become entirely exhausted before delivery of additional quantities can be obtained. This neglect is a common occurrence, as the supply tank is ordinarily placed under the sidewalk or at some point apart from the building and the inspection of the supply of fuel involves an inconvenience and delay.

To avoid such inconvenience, and to insure against such neglect, I have devised an improved level signaling means which consists of a conduit 3 connected into the tank 1 at any convenient point spaced from the usual inlet and delivery connections, not shown. The conduit 3 extends vertically upward from the tank to a point near the surface of the ground or sidewalk 2 above the tank. At the top of the conduit is formed a chamber 4 formed by a cup 6 inset in the sidewalk 2 or other ground covering and threaded or otherwise secured upon the top of the conduit 3. A removable plate 7 is secured upon the bottom of the cup 6 to extend across the top of the conduit, said plate having a pair of threaded openings communicating with the conduit and arranged to receive a stuffing gland 8 and a plug 9. An electric switch is mounted within the chamber 4 upon an insulating block 11 secured upon the plate 7, said switch comprising a pair of contacts 12 carried upon stationary and movable conductors 13 and 14 respectively. The conductors 13 and 14 are connected to electrical connections 15, and 15' carried through a conduit 16 to a point remote from the tank and switch, said connections being connected through a suitable source of electrical energy 20 to a suitable signal or alarm 17 positioned at a point convenient to an operator responsible for the care and supply of the fuel.

The movable conductor 14 is connected in any suitable manner to the upper end of a rod 18 extending upwardly through the conduit 3 and stuffing gland 8 into the chamber 4. A spring 19 is mounted between the top of the stuffing gland 8 and a collar 21 secured upon the upper end of the rod to normally exert a pressure whereby the movable contact conductor 14 is held away from the conductor 13 to break the electrical connection between the contacts 12. A collar 22 is secured upon the rod 18 below the gland 8, said collar 22 being arranged to engage a flanged washer 23 arranged to seat against a suitable packing 24, said washer and packing serving to seal the lower end of the gland and to form a stop limiting the upward movement of the rod 18. The gland 8 is provided with a threaded cap 26 engaging suitable packing 27 upon the upper end of the gland. The cap 26 is secured downwardly onto the packing 27, and the washer 23 is pressed upwardly against the packing 24 by the pressure of the spring 19, thereby effectually sealing the chamber 4 from the conduit 3 and the tank 1. A suitable cover 28 is secured across the top of the chamber 4 to close the top of the chamber 4, said cover being arranged to seat within the surface of the sidewalk 2. The cover is removable to permit inspection of the switch and to give access to the conduit through the plug 9, but is normally securely held to prevent tampering with the switch and to avoid confusion with the usual filling connection.

Figure 3:
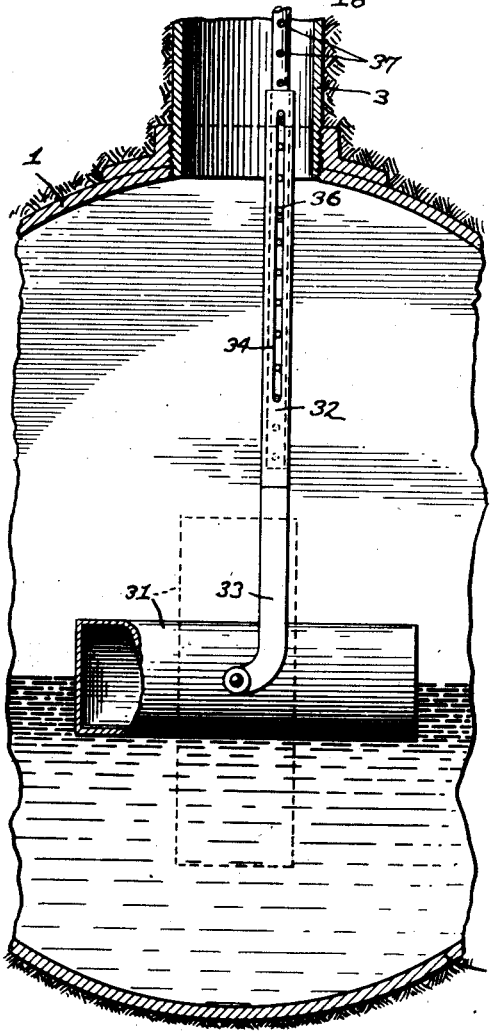
Fig. 3 is a side elevation of the float and its connecting member.
Figure 3:
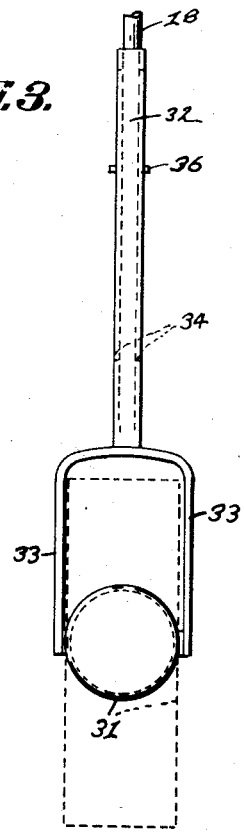

A float 31 is mounted within the tank 1, said float preferably consisting of a hollow cylindrical metal body of a diameter somewhat less then the diameter of the conduit 3 and of a length designed to afford the desired buoyancy. A tubular connecting member 32 provided with a bifurcated lower end 33 is pivotally connected to the float 31 at a point slightly spaced from its longitudinal center, whereby said float when freely suspended, will swing to a vertical position as indicated in dotted lines in Figs. 1 and 3 of the drawings. The lower ends of the bifurcations 33 are slightly curved so that when the float is freely suspended, the axis of the float will coincide with the axis of the conduit 3 where the rod 18 is positioned off center with respect to said conduit as shown in Fig. 1 of the drawings. The upper end of the member 32 is arranged to telescope onto the lower end of the rod 18. A pair of diametrically opposite longitudinal slots 34 are formed in the upper portion of the member 32 to engage the ends of a stop pin 36 arranged to be inserted into any of a plurality of apertures 37 spaced along the lower end of the rod 18. The member 32 is slidably movable relative to the rod 18 and the pin 36 is arranged to be engaged by an end of the slots 34 to impart movement to the rod 18 when the float is moved to a predetermined level within the tank 1.

In operation, my improved level signal, is constructed and installed substantially as shown, the float 31 being lowered into the tank 1 through the conduit 3 while hanging in vertical position, the plate 7 being subsequently secured in place and the chamber sealed by the gland 8 and the plug 9. Assuming the tank to be partially filled, the float is swung to horizontal position and floats upon the surface of the fuel, the tubular member 32 sliding up and down relative to the rod 18 as the level of the fuel is raised or lowered. The pin 36 is set in an adjusted position calculated to cause the upper ends of the slots 34 to engage said pin when the float is lowered to a predetermined level such that the supply of fuel remaining in the tank will meet ordinary requirements until a fresh supply can be delivered. As the level is further lowered, the weight of the float and its connecting member 32 becomes suspended upon the pin 36, thereby causing the rod to be moved downwardly against the pressure of the spring 19 and causing the contacts 12 to close the electric circuit therebetween to operate the alarm 17, thereby warning an attendant that the supply of fuel is nearly exhausted. The contacts 12 will remain in circuit closing relation until the float is raised by the introduction of more fuel into the tank. The signal or alarm may be allowed to operate continually until the tank is refilled, or may be interrupted manually through an auxiliary switch 38 if desired.

If for any reason it is necesary to remove the float from the tank, the plate 7 is removed and as the rod 18 and member 32 are pulled upwardly from the conduit 3, the float will swing to a vertical position whereby it may be raised through the conduit. This arrangement permits a float of relatively large volume to be inserted and removed from the tank without requiring an excessively large conduit. The switch and its connections are accessible at any time when the cover 28 is removed, and if desired the level of the fuel within the tank may be inspected at any time by removing the plug 9 whereby a sounding rod or other level indicating means, not shown, may be introduced into the tank.

The specific construction illustrated and described is particularly adapted for use in the manner explained, both by reason of the simplicity and economy of construction and installation and the simplicity and efficiency of its operation. Furthermore, the sealed chamber at the top of the conduit effectually encloses the electrical connections and prevents any possible danger of igniting the fuel, or gases therefrom, when the electrical connection is made or broken between the contacts 12, and thereby removes all fire hazard such as commonly renders electrical signaling means unsuitable for use in connection with storage tanks used for fuel or other inflammable liquids.

Having thus described my invention what

I claim as new and desire to secure by Letters Patent is—

1. The combination with a storage tank, of a conduit connected into said tank; a chamber formed at the top of the conduit; means for sealing the chamber from the conduit and tank; an electric switch mounted within the chamber and connected through a source of electrical energy to an alarm positioned at a point remote from the tank; a float mounted within the tank; a rod extending upwardly through the conduit into the chamber and connected to the switch; a member connected to the float and slidably telescoping with the rod and arranged to move said rod to actuate the switch when the float is moved to a predetermined position within the tank.

2. The combination with a storage tank, of a conduit connected into said tank; a chamber formed at the top of the conduit; means for sealing the chamber from the conduit and tank; an electric switch mounted within the chamber and connected through a source of electrical energy to an alarm positioned at a point remote from the tank; a float mounted within the tank; a rod extending upwardly through the conduit into the chamber and connected to the switch; a tubular member connected to the float and telescoping onto the rod; and an adjustable stop arranged to cause the rod to be moved by the tubular member to actuate the switch when the float is moved to a predetermined level within the tank.

3. The combination with a storage tank, of a conduit connected into said tank; a chamber formed at the top of the conduit; means for sealing the chamber from the conduit and tank; an electric switch mounted within the chamber and connected through a source of electrical energy to an alarm positioned at a point remote from the tank; a float mounted within the tank; a rod extending upwardly through the conduit into the chamber and connected to the switch, said rod having a plurality of apertures spaced therealong; a tubular member connected to the float and telescoping onto the rod, said member having diametrically opposite longitudinal slots formed therein; and a pin arranged to engage any of the apertures in the rod and the slots in the tubular member whereby the rod is moved to actuate the switch when the float is moved to a predetermined level within the tank.

4. The combination with an embedded tank, of a conduit connected into said tank and extending upwardly therefrom; a chamber arranged at the top of the conduit; a plate mounted in the bottom of the chamber and covering the top of the conduit; a rod extending upwardly through the conduit and through the plate; a stuffing gland engaging the rod to seal the chamber from the conduit and tank; a float mounted within the tank; an electric switch mounted within the chamber and connected through a source of electrical energy to an alarm positioned at a point remote from the tank; a member connected to the float and slidably engaging the rod; and a stop carried by the rod and arranged to be engaged by the member to move said rod and actuate the switch when the float is moved to a predetermined level within the tank.

5. The combination with a storage tank, of a conduit connected into said tank; a chamber formed at the top of the conduit; an electric switch mounted within the chamber and connected through a source of electrical energy to an alarm positioned at a point remote from the tank; a rod extending upwardly through the conduit into the chamber and connected to the switch for actuating the same; a tubular member slidably engaging the lower end of the rod; a float pivotally mounted upon the bottom of the tubular member, said float being arranged to float in horizontal position upon the surface of a liquid stored in the tank, and to swing to a vertical position whereby said float may be inserted and removed from the tank through the conduit, the tubular member being arranged to move the rod and thereby actuate the switch when the level is moved to a predetermined level within the tank.

In witness whereof, I hereunto set my signature.

EDWARD E. PLANT.